United States Patent [19]
Schmitz et al.

[11] Patent Number: 5,642,713
[45] Date of Patent: Jul. 1, 1997

[54] PROCESS FOR CONTROLLING A PISTON INTERNAL COMBUSTION ENGINE BY MAINTAINING THE RUNNING LIMIT

[75] Inventors: Guenter Schmitz; Heinrich Mayer, both of Aachen, Germany

[73] Assignee: FEV Motorentechnik GmbH & Co. Kommanditgesellschaft, Aachen, Germany

[21] Appl. No.: 525,784

[22] PCT Filed: Jan. 31, 1995

[86] PCT No.: PCT/EP95/00338

§ 371 Date: Oct. 4, 1995

§ 102(e) Date: Oct. 4, 1995

[87] PCT Pub. No.: WO95/21322

PCT Pub. Date: Aug. 10, 1995

[30] Foreign Application Priority Data

Feb. 1, 1994 [DE] Germany ............... 44 02 938.1

[51] Int. Cl.$^6$ ................ F02D 41/04; F02D 43/00
[52] U.S. Cl. .................................................. 123/435
[58] Field of Search ......................... 123/425, 435; 73/35.03, 35.04, 35.08, 35.12

[56] References Cited

U.S. PATENT DOCUMENTS

| | | | |
|---|---|---|---|
| 5,107,813 | 4/1992 | Inoue et al. | 123/435 |
| 5,113,828 | 5/1992 | Remboski et al. | 123/435 |
| 5,125,381 | 6/1992 | Nutton et al. | 123/435 |
| 5,153,834 | 10/1992 | Abo et al. | 123/435 |
| 5,156,126 | 10/1992 | Ohkubo et al. | 123/435 |
| 5,247,910 | 9/1993 | Abe | 123/435 |
| 5,276,625 | 1/1994 | Nakaniwa | 123/435 |
| 5,353,764 | 10/1994 | Tomisawa | 123/435 |
| 5,421,305 | 6/1995 | Tomisawa | 123/435 |

FOREIGN PATENT DOCUMENTS

| | | |
|---|---|---|
| 0 297 951 | 1/1989 | European Pat. Off. . |
| 0 370 594 | 5/1990 | European Pat. Off. . |
| 0 579 271 | 1/1994 | European Pat. Off. . |
| 29 06 782 | 9/1980 | Germany . |
| 33 15 048 | 10/1983 | Germany . |
| 33 14 225 | 10/1984 | Germany . |
| WO89/11031 | 11/1989 | WIPO . |

OTHER PUBLICATIONS

Patent Abstracts of Japan, vol. 5, No. 90 (M–73) 12 Jun. 1991 & JP, A, 56 038 559 (Daihatsu Motor Co.).

IEE Proceedings D. Control Theory & Applications, Bd. 136, Nr. 2, Mar. 1989, Stevenage GB Seiten 84–88, "Engine Control System Using A Cylinder Pressure, Sensor", Y. Hata et al.

*Primary Examiner*—Willis R. Wolfe
*Attorney, Agent, or Firm*—Spencer & Frank

[57] ABSTRACT

A process for controlling a piston internal combustion engine by maintaining a running limit thereof. The process includes the steps of: detecting in at least one cylinder, over at least one work cycle and without reference to a crankshaft position of the engine, a measured variable which is influenced by a conversion of fuel into energy; setting the measured variable in relation to a detected, stored measured variable of at least one previously intercepted work cycle; and producing an adjusting signal from any deviation between the measured variables for inputting the adjusting signal to an engine regulation system. The measured variable can be either a pressure course, a light intensity or an ion current corresponding to the combustion process within the engine.

23 Claims, 10 Drawing Sheets

PROCESS FOR CONTROLLING A PISTON INTERNAL COMBUSTION ENGINE BY MAINTAINING THE RUNNING LIMIT

FIELD OF THE INVENTION

The invention pertains to a process for controlling a piston internal combustion engine.

BACKGROUND OF THE INVENTION

The constantly increasing demands for pollution reduction have recently led to the introduction of concepts involving a lean fuel mixture and concepts involving exhaust recirculation, among others. Lean fuel mixture concepts have the advantage of making fuel economy is possible, in addition to leading to a reduction of raw emissions. With exhaust recirculation concepts, when a 3-way catalytic converter is used at the same time, a particularly good reduction of overall emissions is possible.

It is common to both concepts that in certain operating ranges of the engine, it is desirable to use a fuel which is leaned down as much as possible and to establish a high exhaust recirculation rate, respectively, while necessarily maintaining a certain margin from the so-called "running limit." The "running limit" can be defined as the limit of the leaning down and/or or of the exhaust recirculation rate beyond which ignition of the mixture no longer occurs reliably for every piston working cycle, where an acceptable running smoothness of the engine does not occur, or where exhaust emissions begin increasing again because of insufficient combustion. Because of the need to maintain a required margin from this running limit, the potential of these two concepts, that is, the potential of using lean fuel mixtures and of recirculating the exhaust, is not completely utilized.

Principles for recognizing the running smoothness of the engine are disclosed in DE-A-29 06 782 for lean regulation by using a rotational irregularity sensor, in DE-A-33 15 048 by means of structure-borne sound sensors, and in DE-A-33 14 225 via an exhaust volume flow measurement, as well as in other prior publications. Recognizing the "running limit" by making use of rotational irregularity can be used principally in engines that are on the test bench. However, the above cannot be accomplished in the case of engines disposed in production vehicles, since uneven spots in the road, which lead to misleading signals, are fed in via the drive train.

In practice, the recognition of the "running limit" in a production vehicle via structure-borne sound sensors is hardly usable either. Besides possible input resulting from uneven spots in the road, there are also a wealth of interfering signals, which lead to problems of misinterpretation because of an extremely poor signal-noise ratio, which is due to the relatively low useful signal that can be detected.

Additionally, an analysis of the exhaust volume flow is relatively complicated to perform and, consequently, cannot be introduced in production vehicles at least for cost reasons.

The use of combustion chamber pressure sensors for recognizing the running limit has previously been intensively employed in the development of engine tuning. The tuning is performed each time such that a distinct margin from the lean running limit is maintained. With the availability of fairly inexpensive but quite precise combustion chamber pressure sensors, this method has meanwhile been introduced even in production vehicles, by providing lean regulation. References to the above are found in publications SAE 930882 and 930351 of the 1993 SAE Congress in Detroit. In the process proposed in the above publications, an estimate of the effective torque is derived from the combustion chamber pressure. In addition, the pressure values of certain positions of the crankshaft are estimated and from the same, an estimate of the internal work performed by the engine is derived. The above process relies on the process for tuning engines which is practiced on the test bench, and in which the so-called indicated mean effective pressure, i.e. the contour integral of the pressure, is determined via the cylinder volume. A measure for the running smoothness is derived via statistical methods from the above internal work or from the estimated moment introduced. In the above process, however, knowledge of the crankshaft state is critical to the derivation of the current volume of the combustion chamber from the respective structural data of the relevant engine. For the above reason, in mass production of running limit recognition according to this method, the signal of the combustion chamber pressure transducer is supplied to a processing circuit, which receives information about the state of the crankshaft from a crankshaft angle marking sensor as a further input signal. The processing circuit is integrated into the engine control electronics remote from the sensor, since the crankshaft angle marking transducer signals are also available at that location. As a result, however, each manufacturer encounters the necessity of specifically implementing an algorithm in the engine electronics that perform the corresponding evaluation. If this recognition is realized with software in an already existing processor of the engine control electronics, then this software function can be integrated into existing engine control software only at a high cost. In order to avoid the above, a second processor must be employed, which, however, require a redesign of all the electronic hardware of the engine.

SUMMARY OF THE INVENTION

The object of the invention is to now to achieve a process for recognizing the running limit which allows the running limit to be regulated, thus preventing the running limit from being exceeded, as could happen for example as a result of changing ambient conditions, at such favorable cost that this regulation can be used in production vehicles.

The above object is attained according to the invention by maintaining a running limit thereof. The process includes the steps of: detecting in at least one cylinder, over at least one work cycle and without reference to a crankshaft position of the engine, a measured variable which is influenced by a conversion of fuel into energy; setting the measured variable in relation to a detected, stored measured variable of at least one previously intercepted work cycle; and producing an adjusting signal from any deviation between the measured variables for inputting the adjusting signal to an engine regulation system. The measured variable can be either a pressure course, a light intensity or an ion current corresponding to the combustion process within the engine. The above process forgoes the detection of the crankshaft position and uses only the detected, influenceable measured variable to determine the running limit. For the measured variable which can be influenced by the conversion of fuel into energy and/or exhaust (for example pressure course per work cycle, light intensity of the combustion process per work cycle, ionic current measurement per work cycle), sensors are already available. Hence, through these sensors, a signal is already available that directly represents the current status of conversion of the fuel into energy and/or exhaust in the cylinder and enables the detection and formation of a signal derived from the signal without additionally having to have recourse to a crankshaft angle marking transducer or having to tap into existing systems. By comparing the influenceable measured variable, which is detected in one or more previously intercepted work cycles, with the deviations resulting from the same, a conclusion is drawn as to whether the predetermined running limit and hence the desired running smoothness of the engine is being maintained by the status of regulation at the time of the comparison. Therefore, without loss of running smoothness, the engine regulation can be brought much closer to the running limit without exceeding the same. It is especially advantageous in this case that not all of the cylinders of an engine have to be monitored; it is sufficient to detect the influenceable measured variable in one cylinder. In this connection, it is advantageous if, in a given engine, the cylinder which will reach the running limit the soonest, as can be the case for example if there exists a structurally dictated uneven distribution in the intake tube, is chosen. However, if all cylinders should behave practically identically with regard to the running limit, then by purposeful "mistuning" of the system it can be assured that a predetermined cylinder is always the first to reach the running limit. In the event of lean regulation, this can be done by consistently injecting a smaller quantity into one cylinder than into the other cylinders. Since in operation this cylinder is now the first to reach the running limit, one can be certain that if running limit regulation is done with respect to this cylinder, all the other cylinders will still have sufficient running smoothness; consequently the overall running smoothness and the overall emissions values are reliably kept within the required limits.

In a preferred embodiment of the process according to the invention, it is provided that the measured variable which can be influenced by fuel conversion corresponds to the course of pressure in the work cycle. For the sake of measuring the running smoothness or of determining the running limit without using a crankshaft angle marking transducer signal, it is in fact particularly suitable for the course of pressure in the combustion chamber, because it is so conclusive and because of its favorable signal-noise ratio, to be detected as the measured variable that can be influenced by means of the conversion of fuel.

In another embodiment of the process according to the invention, it is provided that the measured variable, which can be influenced by the fuel conversion into energy and/or exhaust corresponds to the light intensity of the combustion process. The point at which combustion begins and at which it ends can be recognized particularly well by registering the light intensity at each work cycle. The light intensity may then be compared to signals of previously intercepted work cycles previously detected at intervals and from the above comparison a corresponding adjusting signal can be derived.

In another embodiment of the process according to the invention, it is provided that the measured variable which can be influenced by the fuel conversion into energy and/or exhaust is measured by means of an ionic current, which changes during the combustion process.

Advantageous embodiments and improvements of the process according to the invention, in particular with regard to the evaluation of the detected, influenceable measured variable will be described further below.

To realize the process according to the invention, the invention further provides a device for performing the process in a piston internal combustion engine, in which at least one cylinder is connected to a sensor for detecting a measured variable corresponding to the conversion of fuel into energy, as a function of time; this sensor is connected to a characteristic forming device for forming a characteristic signal, which is derived from the detected measured variable, and the signal output of the characteristic forming device is connected to an evaluation unit. The advantage of the above device is comprised in concerns the possibility of connecting the device to an already existing electronic engine control system without changing the software and hardware.

Further advantageous embodiments of the device according to the invention are explained as set forth below.

DETAILED DESCRIPTION OF THE INVENTION

Figure 1:
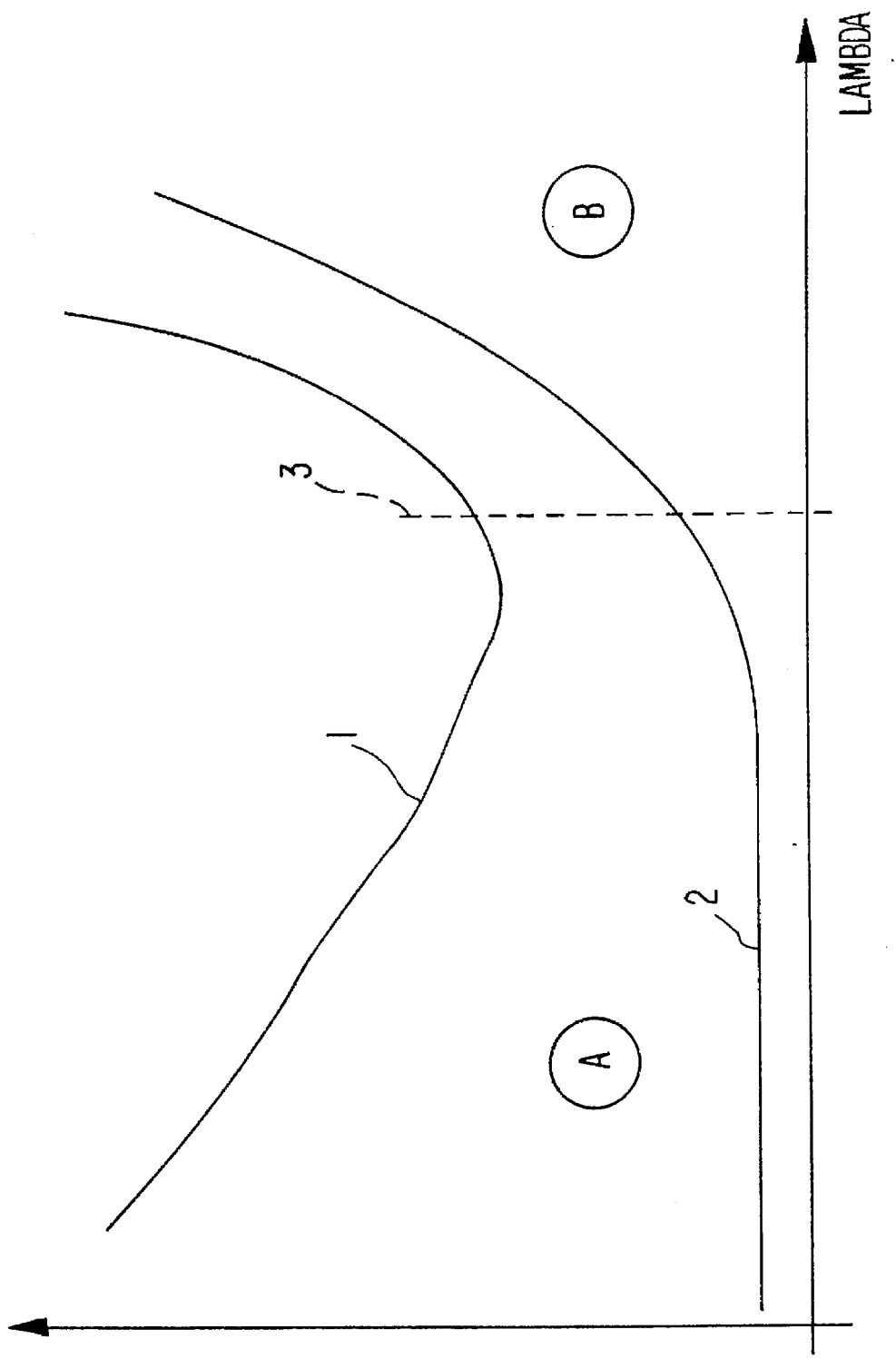
FIG. 1 is a graph of the running smoothness and the emissions versus the air ratio lambda.

In FIG. 1, the course of the emissions (curve 1) and the changing of running smoothness (curve 2) are shown as a function of the air ratio number lambda. As can be seen from curve 1, with increasing leaning of the fuel mixture, or with increasing exhaust recirculation, and the attendant increase in the air ratio number, the emissions shown in curve 1 drop to a minimum. After a minimum is achieved, the emissions rise sharply.

In comparison with the above, the running smoothness represented by curve 2 remains constant over wide ranges, until it rises in the region of the emissions minimum. In this way, the so-called running limit 3 is established as the limit for the exhaust recirculation rate or the leaning beyond which the ignition of the mixture no longer occurs in every engine work cycle as reliably, causing the measure of acceptable running roughness to be exceeded. The running limit 3 consequently divides region A of "running smoothness" from region B of "running roughness".

Figure 2:
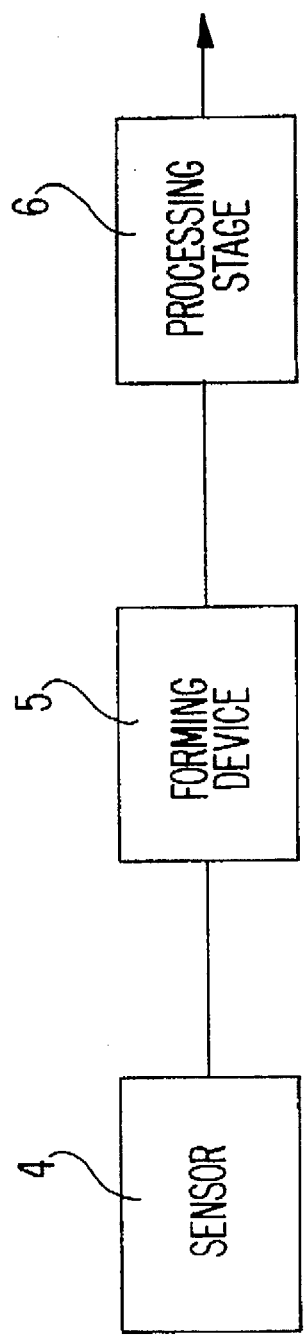
FIG. 2 is a block circuit diagram of the process according to the invention.

The process is explained in relation of the block circuit diagram according to FIG. 2. A sensor 4, via which a measured variable (pressure, light, ionic current) which can be influenced by i.e., which corresponds to the conversion of fuel into energy and/or exhaust is detected as a function of time, furnishes a course signal to a device for forming characteristics, or to a forming device 5. At least one characteristic is extracted from the course signal, and in a subsequent processing stage 6, this characteristic is "set in relation" to one or more characteristics from the course signals of previous work cycles or at least of one previous work cycle. In that regard, this "setting in relation" can be a simple comparison, a subtraction, or a statistical evaluation. However, this setting in relation can also be done by forming a cross-correlation function of the course signal with a similar, time-delayed signal course. This cross-correlation function yields, in turn, characteristics that can be compared to one another. A particularly highly suitable characteristic is the respective maximum of the cross-correlation function, which represents a measure for the speed of two successive work cycles. By means of the comparison, subtraction, or statistical evaluation of precisely this maximum (generally of extracted characteristics), a conclusion is now drawn about the statistical fluctuations of the combustion process, about the measured variable which can be influenced by the conversion of fuel, and consequently about the running smoothness or running roughness of the engine.

Figure 3:
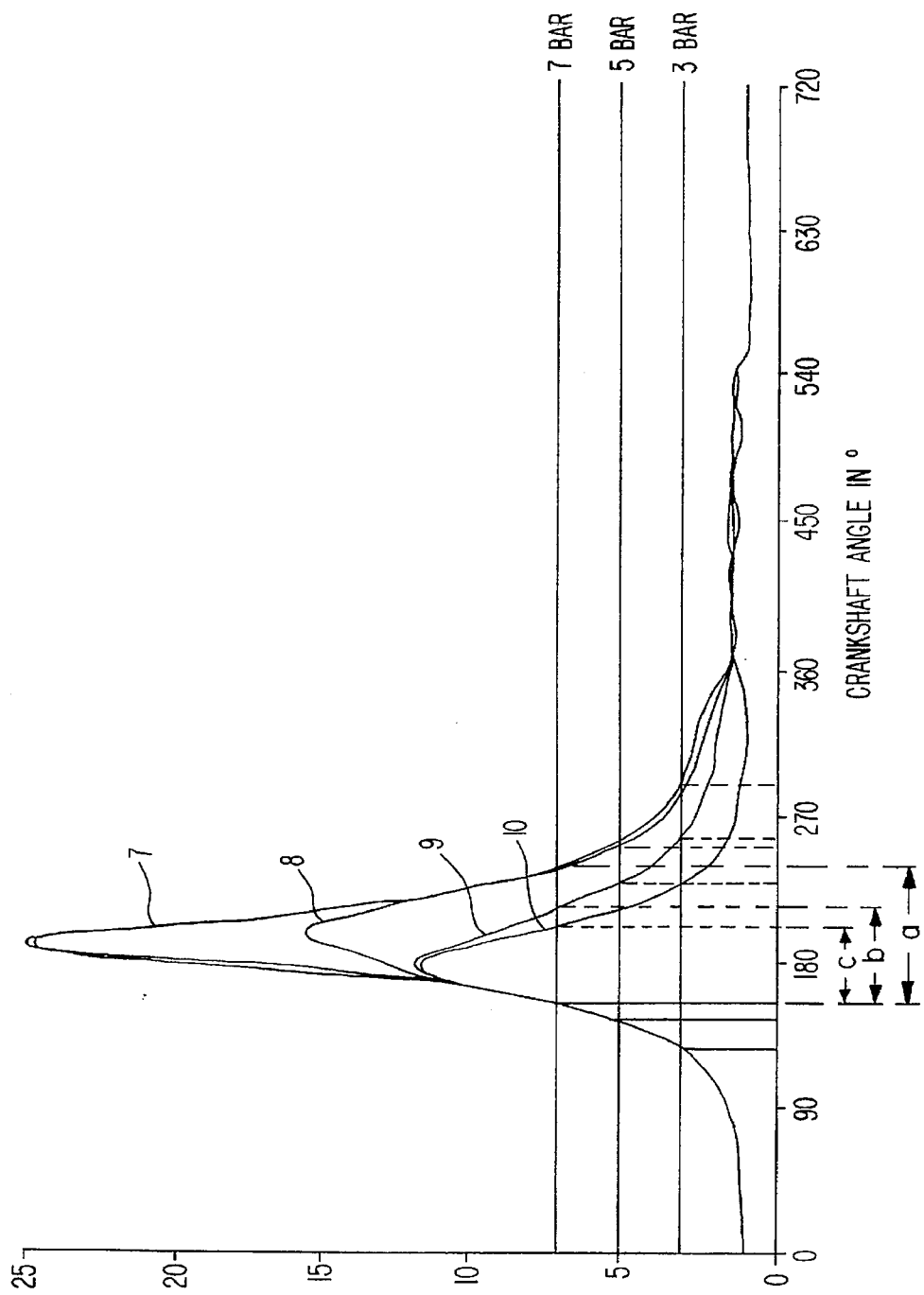
FIG. 3 is a graph of pressure courses versus crankshaft angle in an overlay.

In FIG. 3, the above is explained in further detail via the detection of the pressure course as the measured variable which can be influenced by the conversion of fuel into energy and/or exhaust. In an overlay in FIG. 3, a plurality of pressure course signals 7, 8, 9, and 10 are depicted as a function of the crankshaft angle. When the pressure course is selected, the "width" of the pressure course curve at a predetermined pressure is determined as the measured variable to be detected. In the exemplary embodiment shown in FIG. 3, the indicated width a results from the pressure course curve 7 at the indicated threshold value of 7 bar. Upon a subsequent measurement under altered operating conditions, such as increased leaning down, a pressure course curve 8 with a visibly lower peak pressure is the result. Nevertheless, the "width" of the pressure course detected here is unchanged, so that the ignition of the mixture is still performed reliably, and accordingly there is no change in the running smoothness.

As can be seen from the pressure course curves 9 and 10, if the pressure is now further reduced as the leaning down is further intensified, then a clear reduction of the "width" of the pressure course curve to the measure b or c is the result. The comparison between pressure course 9 and pressure course 10 shows that at equal maximal pressure, the combustion process is different, and so from this it can already be concluded that the running smoothness between these two work cycles already leads to considerable deviations.

Depending on the characteristic curve of the engine, the system may be made more sensitive by selecting the threshold values. As can be seen from FIG. 3, a reduction of the threshold value from 7 to 5 bar already leads to a distinct spreading, and therefore to an increase in the differences between the relevant "widths" a, b, and c.

Figure 3A:
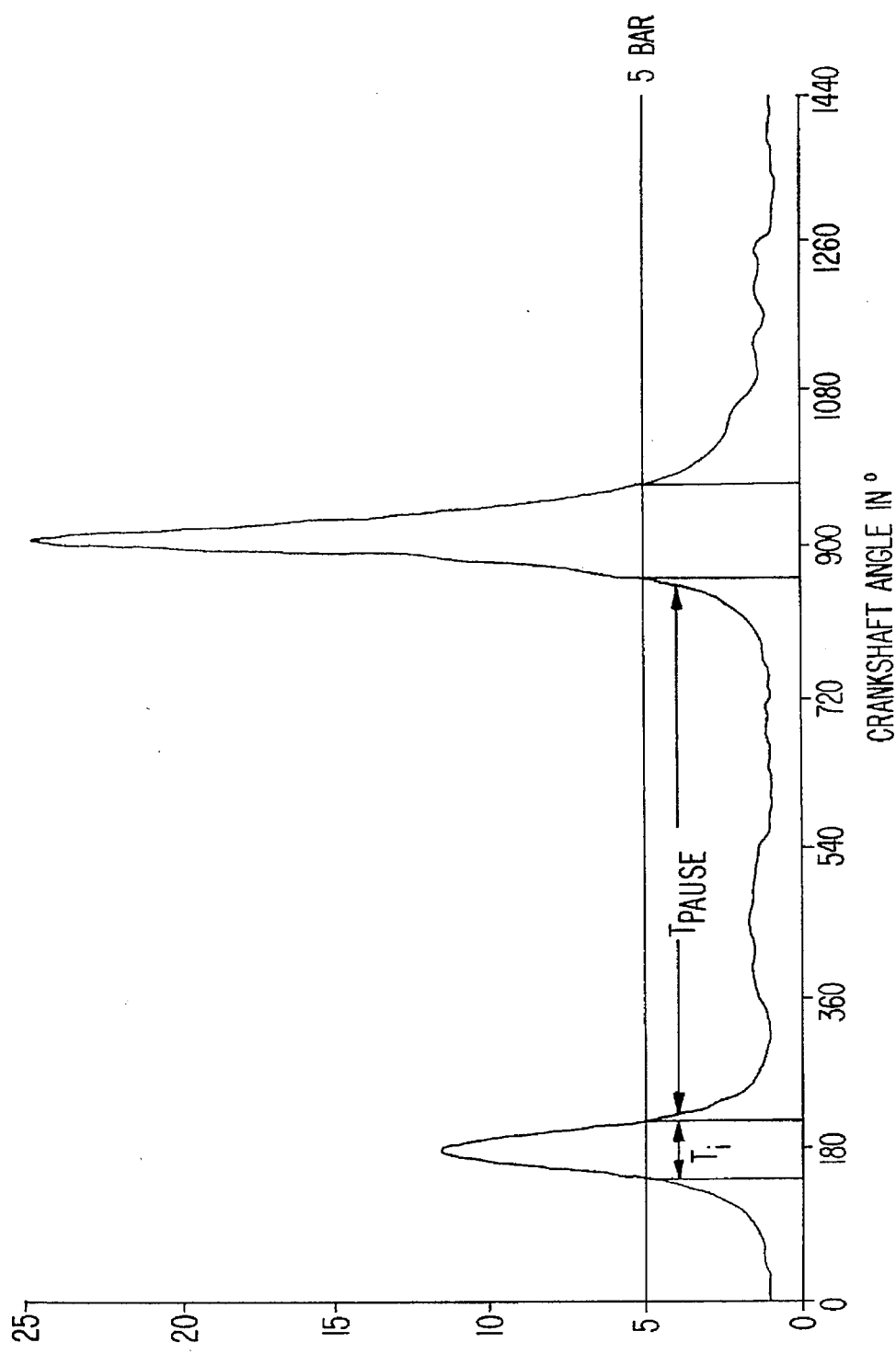
FIG. 3a is a graph of two different pressure courses versus crankshaft angle in chronological succession.

In FIG. 3a, the process described in FIG. 3 is shown in chronological succession, but in a reverse order, for a threshold value of 5 bar.

In a preferred embodiment of the invention, the pressure signal course is first compared to a threshold value and is consequently available as a square-wave signal at the output of the comparison. Instead of now evaluating the width of the square pulse, which can naturally also be done by the proposed process, the measurement of the pulse to no-current ratio, i.e. the duty factor, of this train of square pulses is particularly advantageous for further evaluation. An improvement in lower sensitivity to rapid engine-speed fluctuations is achieved as a result. The pulse to no-current ratio can now in turn be compared to the preceding measurement values for the duty factor according to methods using chronological comparison, or subtraction, or according to statistical methods. The method involving chronological setting is performed in the evaluation stage 6.

The use of the standard deviation has shown itself to be particularly suited for the evaluation algorithm in the evaluation stage 6. This standard deviation can be formed over a number of the last n cycles, for example. The value 10 has proven to be particularly favorable for n, since it represents an optimal compromise between reaction speed and lowering sensitivity to interfering influences. As postprocessing of the standard deviation in the evaluation stage 6, this standard deviation can be advantageously standardized to reduce an influence of the respective load point of the internal combustion engine. For this standardization, it is especially advantageous to use the mean value of the signal. The formation of the mean value can be done either from the extracted characteristic alone ("width" of the pressure course signal, light measurement, ionic current) or from the actual mean value of the detected measured variable, for example of the pressure course signal. The period of time for forming the mean value can either be coupled to the period of time for forming the standard deviation or be freely chosen in accordance with other criteria. The best compromise for the respective use is likewise determined by doing the above. For applications involving high dynamics, the period of time is selected to be relatively short, whereas for stationary motors, for example, the period of time for forming the mean value can be selected to be quite long. For practically employed production engines, a number of about 10 cycles has again been found to be normally favorable.

To form the standard deviation and the mean value, the measuring window can involve either a constant number of cycles (pulses) or a constant duration.

The threshold value described by FIG. 3 has different optimal settings for different load points. As a result, it is very practical to allow this threshold value to be determined automatically. One possible way to determine the threshold value is to use the value of the preceding pulse to no-current ratio, which gives an indication as to what the "relative level" is for the detected measured variable, for example the combustion chamber pressure, at the threshold value. Another possible way of determining and plotting the threshold value is to evaluate the maximum and/or the mean value of the detected measured variable, for example the pressure. However, the determination of the threshold value is not limited to the above characteristics. Other characteristics and methods can also be found that enable automatic adaptation of the threshold value, for example in the form of a regulation to a constant duty factor.

The complete running smoothness recognition circuit (comprising the characteristic former 5 and the evaluation stage 6) and also individual parts of the evaluation unit can be designed in either analog or digital form, or as a microprocessor circuit.

Figure 4:
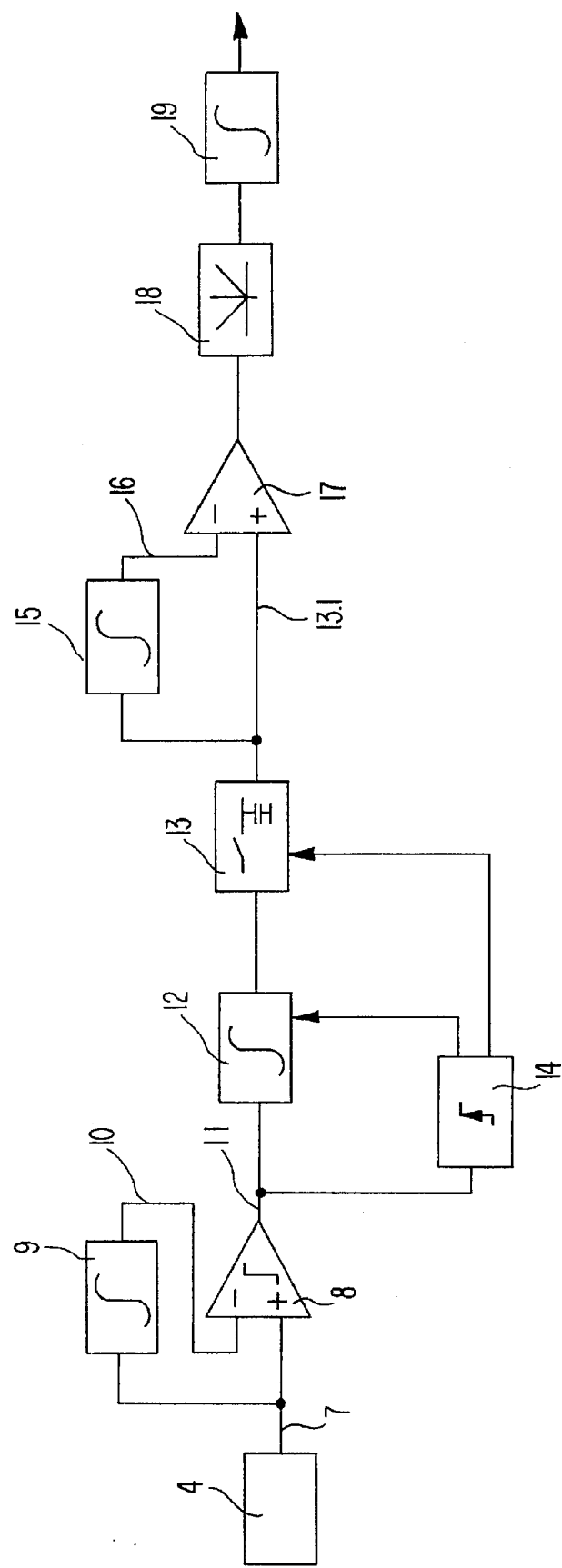
FIG. 4 is a schematic representation of an evaluation circuit.

FIG. 4 illustrates an exemplary embodiment via which the process, functioning in accordance with the pulse to no-current ratio, can be performed in analog form. The measured variable signal 7, which is detected by the sensor 4, is first supplied to a comparator 8 and compared to the mean value 10, which is formed via the integrator 9. The above-described square-wave signal 11 is then available at the output of the comparator 8. In the subsequent stage, the signal is added up in an integrator 12 to determine the pulse to no-current ratio. At the beginning of each cycle, the integrator 12 is reset to "0". At the end of each cycle, the value of the integrator 12 is transferred to a sample-and-hold circuit 13. Resetting the integrator 12 and the transfer to the sample-and-hold circuit are controlled via an edge detector 14, which evaluates the signals coming from the comparator output.

At the output 14 of the sample-and-hold circuit 13, there is now a value which represents the duty factor of the signal. This signal is now supplied on the one hand to a mean value former 15, also called an integrator here, which is responsible for forming the mean duty factor. This mean value 16 formed is now compared to the respective incoming signal 14 by means of a subtractor 17. The output signal present at the subtractor goes through an absolute value former 18 and can then either be immediately output or goes through one more transient integration stage 19, which further carries out a certain smoothing of the output signal.

To clarify the functioning of the overall circuit, let it first be assumed that the engine runs very smoothly, and hence the measured variable detected, for example the combustion chamber pressure, is practically the same in one cycle as it is in each subsequent cycle. Then a square pulse train with a constant pulse to no-current ratio is formed at the output of the comparator 8. This leads to a constant signal at the output of the integrator 12 or the sample-and-hold circuit 13. This constant signal is averaged on the one hand in the mean value former (transient integrator 15) and compared to the respective actual signal 13.1. However, since the actual signal practically always corresponds to the mean value, a 0 signal is produced at the output of the subtractor 17.

Next, let it be assumed that the engine is brought out of this operating state into an operating state in which it is operated at the running limit. Due to the cyclical fluctuation of the measured variable detected, for example of the pressure course signal, now the output pulse train of the comparator 8 will have a different duty factor. As a result, there are constantly changing values at the output of the sample-and-hold stage 13. If these are now compared to their own mean value 16, then the result is sometimes a positive and sometimes a negative difference. All the differences are converted to positive values by the absolute value for 18, which is inserted on the output side of the subtractor 17. On the output side of the transient integrator 19, which follows the absolute value former, a signal is now available, which becomes larger as combustion chamber pressure courses behave more irregularly. Consequently, this signal represents a measure of the running smoothness or the running roughness of the engine.

Figure 5:
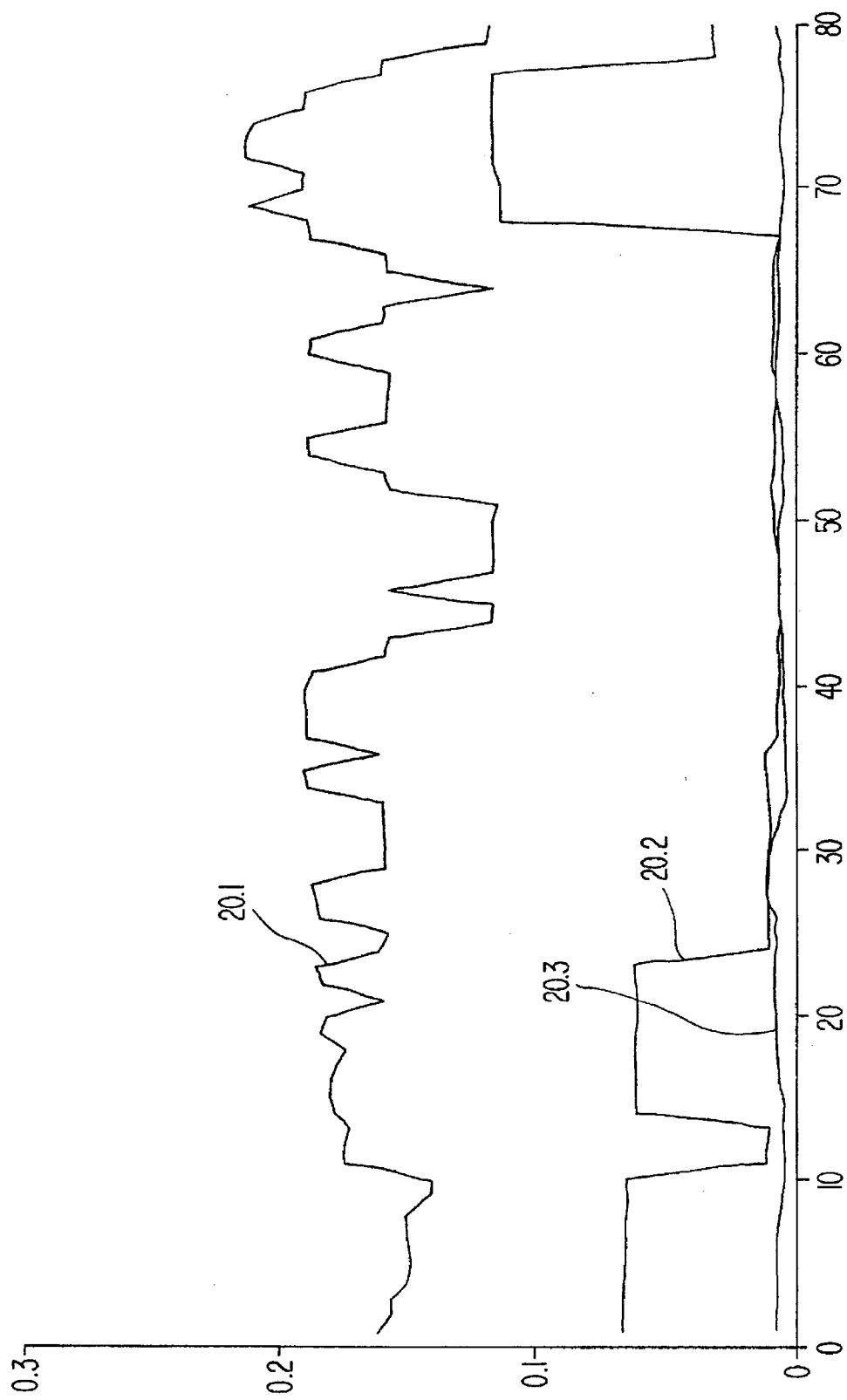
FIG. 5 is a graph showing the course of the output signal of the circuit according to FIG. 4 for different operational states.

The depiction described in FIG. 5 shows an output signal of a digitally designed evaluation circuit as a standard deviation from the duty factor of each ten successive cycles of the engine. In this connection, curve course 20.1 shows the latter-described case of major running roughness, while curve course 20.2 shows a mean operating state with running roughness, and curve course 20.3 shows an operating state with slight running roughness, i.e. good running smoothness. The strong dependence of the signal on the running roughness of the engine can be clearly recognized. It can also be seen that even at a principally constant operating point of the engine, a transient alteration of the running smoothness leads to an output signal which changes acutely (and considerably), as can be seen in signal curve 20.1. Within about twenty work cycles, the regulation is plotted in such a way that low running roughness, i.e. pronounced running smoothness, is achieved.

Figure 6:
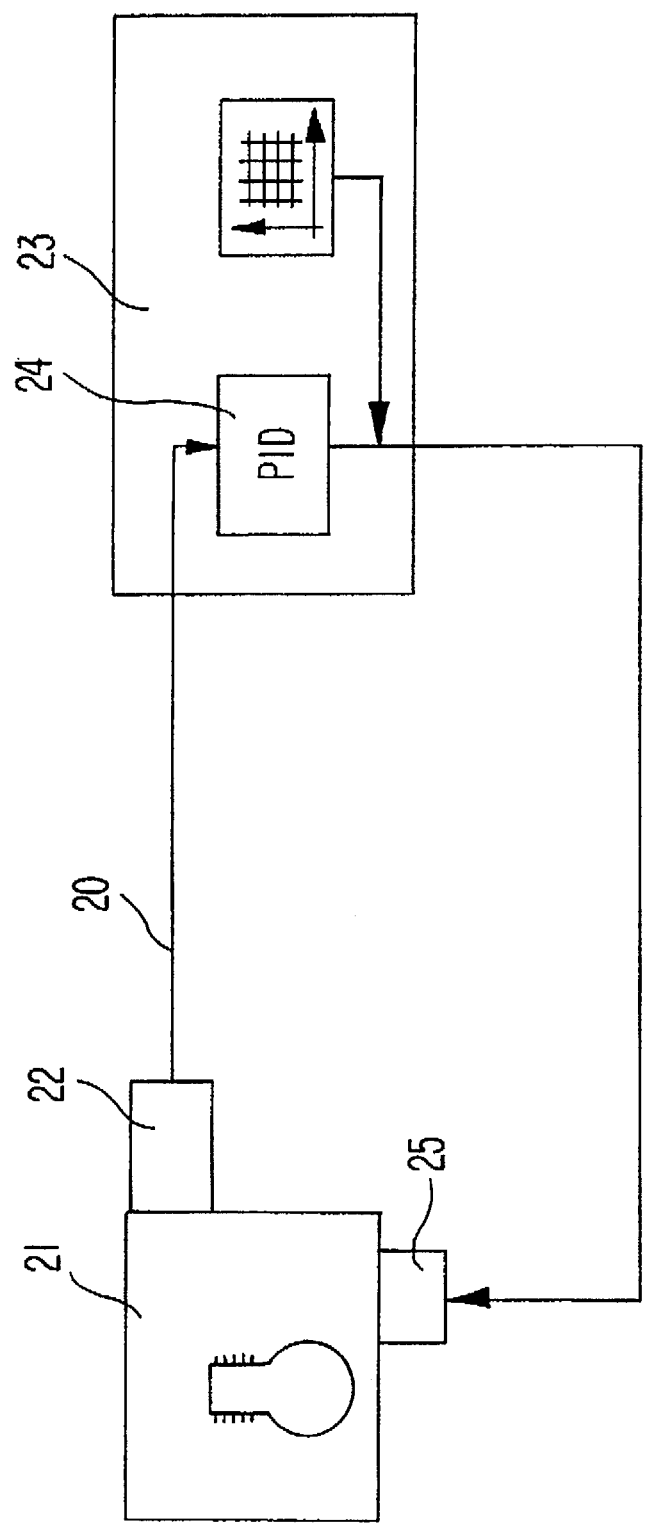
FIG. 6 is a schematic black circuit representation of the circuit according to the invention connected with an internal combustion engine.

FIG. 6 shows a means of running smoothness regulation in the form of a block circuit diagram. A sensor 22 with an integrated running smoothness recognition circuit of the above described type is connected to an engine 21 equipped with exhaust recirculation. The running roughness signal 20, which comes from the running smoothness recognition circuit of the sensor 22, is sent to the engine electronics 23, where it is supplied for example to a PID controller 24.

First, a certain exhaust recirculation value is given to the exhaust recirculation valve 25 by means of a precontroller that operates in the manner of a performance graph. If the running limit is now reached, the PID controller assures that the exhaust recycling signal is changed until the desired value for the running smoothness has been established (see curve course 20.2 in FIG. 5).

Figure 7:
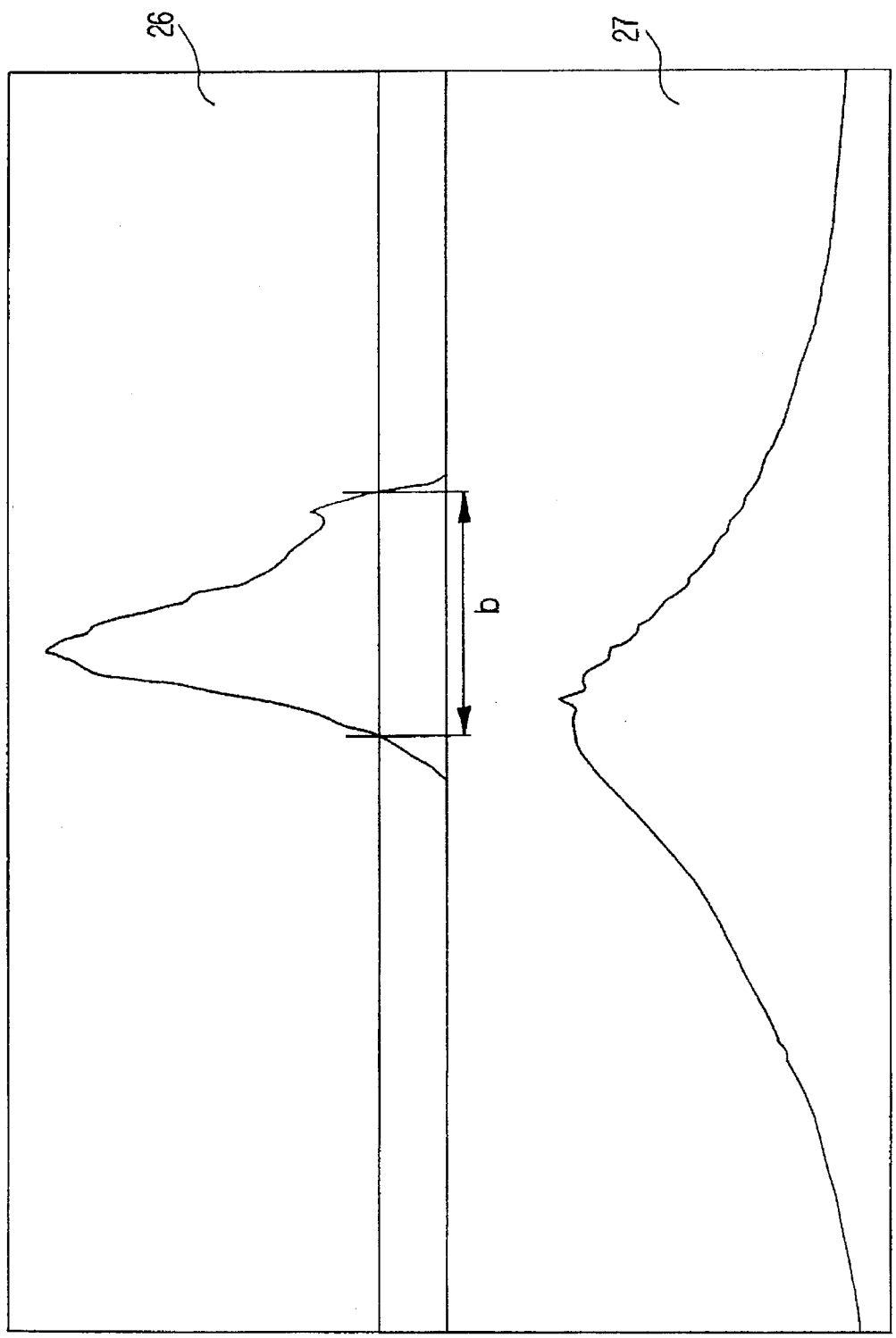
FIG. 7 is a graph of light signals used as measured variables corresponding to the fuel conversion.

In lieu of the above described process of evaluating the pressure course as a measured variable which can be influenced by the conversion of fuel into energy and/or exhaust, it is also possible by the process to evaluate light signals which are obtained from the combustion chamber. To do so, optical access to the combustion chamber is created; this can be done for example in the form of a modified spark plug. The light signal is first converted into an electrical signal via a corresponding sensor, for example a photodiode, a phototransistor, a photomultiplier, or the like. The resultant electrical signal is described in FIG. 7 by diagram 26, which is shown here simultaneously with diagram 27 of the affiliated pressure course of the combustion chamber pressure. The point at which the combustion begins and the point at which the combustion ends in the observed part of the combustion chamber can be recognized particularly well from the light signal.

The measurement signal, which is obtained thus from the measured variable "light" can now be evaluated according to the desired characteristics, as is described in FIGS. 4 and 6. In diagram 26, the signal width "b" for example is shown for a predetermined light intensity threshold. The further processing is then performed as described by FIG. 4 for the "width" of the pressure signal. As with the processing of the pressure signal, in processing the light signal, one is also not limited to the evaluation of the "width" or of the duty factor; instead, other characteristics of the light signal can also undergo the subsequent statistical evaluation.

Figure 8:
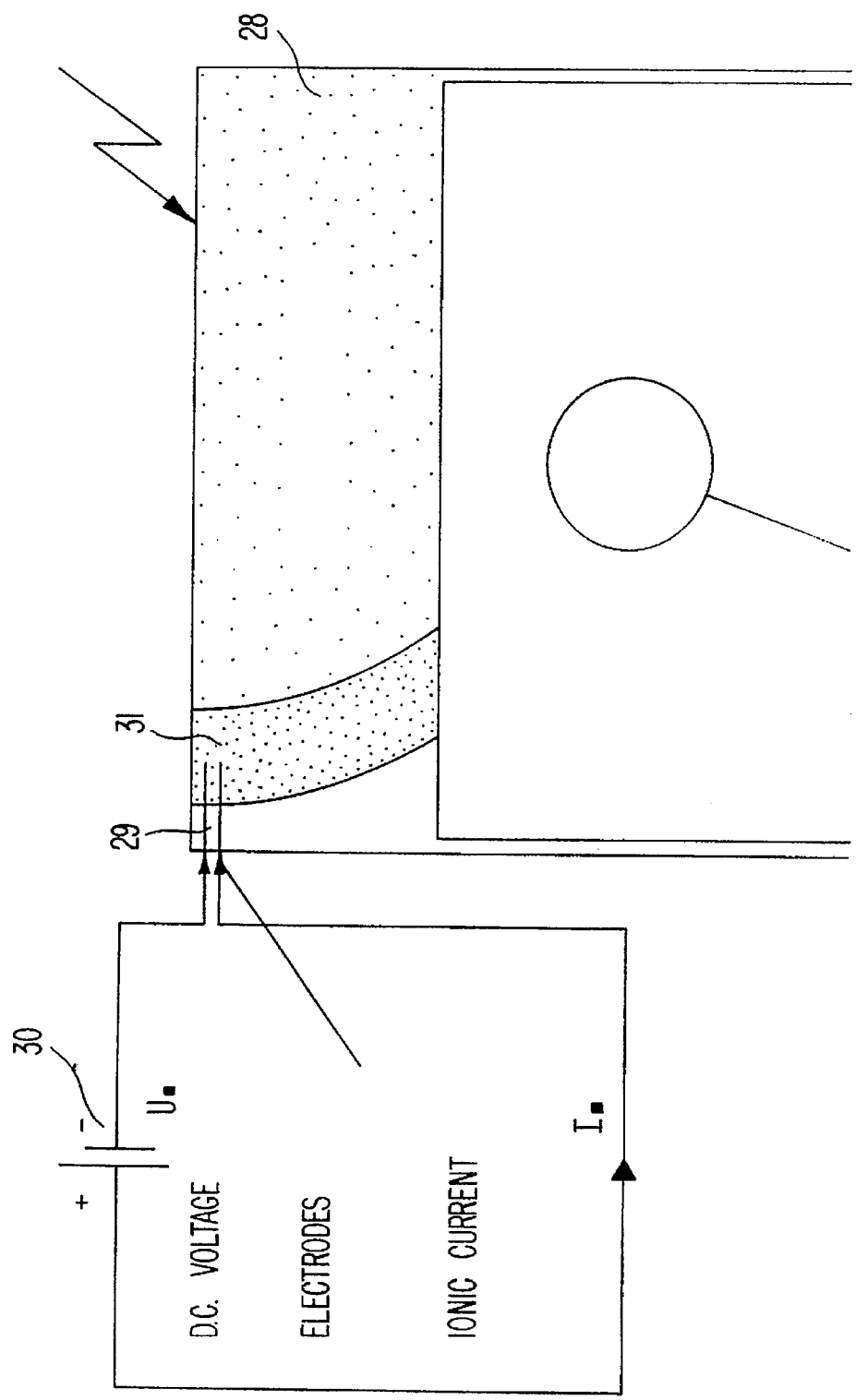
FIG. 8 is a schematic representation of an ionic current device for measuring the measured variable corresponding to the fuel conversion.

FIG. 8 shows the application of the process to the evaluation of the ionic current as a further possibility for detection of a measured variable which is influenced by the conversion of fuel into energy and/or exhaust. Two measurement electrodes 29 (or one measurement electrode, in a unipolar embodiment), which are connected to a constant voltage source 30, are disposed in the combustion chamber 28 of a cylinder of a reciprocating piston internal combustion engine. Normally, no current flow occurs now between the two measurement electrodes 29, provided that small leakage currents are disregarded. In the course of the work cycle, if the electrodes 29 are now engaged by the flame front 31 which is schematically represented here, then there is an ionizable gas in the region of the electrodes 29, and so an ionic current flows between the two poles of the measurement electrodes 29. This ionic current can now be measured. In lieu of measuring the ionic current, the change in the d.c. voltage applied can also be measured, which is produced at the electrodes at the start of the ionic current flow.

A d.c. voltage supply that operates in a voltage range between 50 and 100 volts has proven to have a particularly well-suited voltage range. In principle, the process also functions at other voltages.

Figure 9:
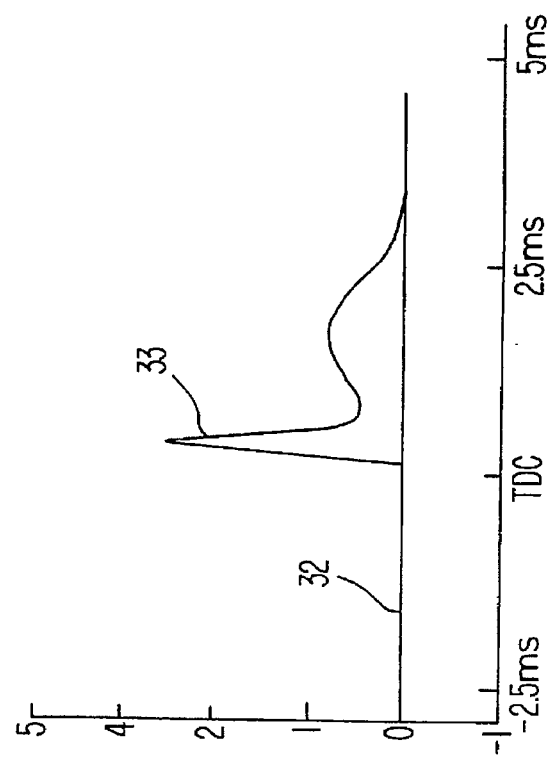
FIG. 9 is a graph of the course of the ionic current versus time during a work cycle.

FIG. 9 schematically shows the ionic current or probe voltage that is established over time. Curve course 32 represents the voltage course when no ignition occurs. Curve course 33 shows the probe voltage course when an ignition occurs in the relevant cylinder. This comparison shows that here too, an evaluation of the ionic current signal can be performed in the above described manner. The use of ionic current measurement in the combustion chamber turns out to be particularly favorable whenever the ionic current is measured via the already existing electrodes of the spark plug in the combustion chamber. This kind of ionic current measurement process via the spark plugs is known in principle and has already been proposed for the recognition of combustion misfires.

Figure 10:
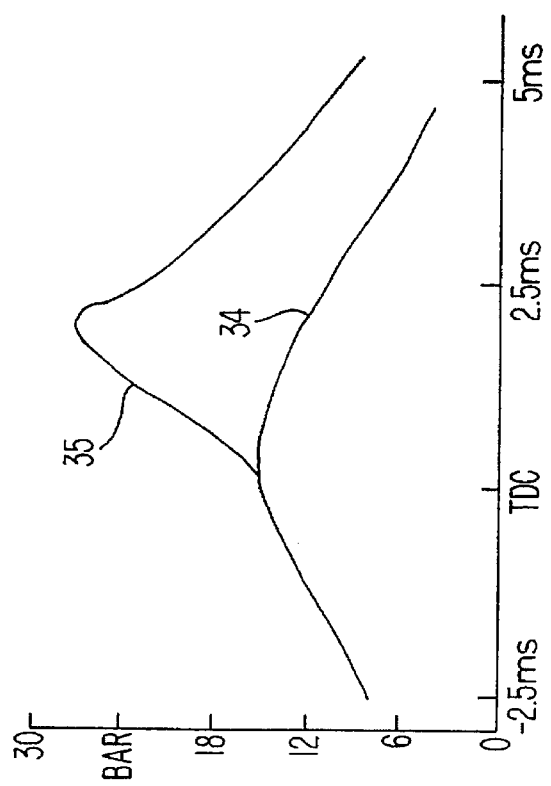
FIG. 10 is a graph of the course of cylinder pressure versus time during a work cycle similar to the one according to FIG. 9.

FIG. 10 shows the pressure course in a cylinder in comparison to FIG. 9. In this connection, curve course 34 shows the course of the combustion chamber pressure in a work cycle without ignition, while curve course 35 represents the course of the combustion chamber pressure with ignition.

The process is not only for use in reciprocating piston engines, but in all engines with periodic fuel conversion, hence also in rotating piston engines for example.

We claim:

1. A process for controlling a piston internal combustion engine by maintaining a running limit thereof comprising the steps of:
   detecting in at least one cylinder, over at least one work cycle and without reference to a crankshaft position of the engine, a measured variable which is influenced by a conversion of fuel into energy;
   setting the measured variable in relation to a detected, stored measured variable of at least one previously intercepted work cycle; and
   producing an adjusting signal from any deviation between the measured variable and the stored measured variable of the at least one previously intercepted work cycle for inputting the adjusting signal to an engine regulation system.

2. The process according to claim 1, wherein the measured variable is a pressure course of a corresponding combustion process within the engine and the stored measured variable is a stored pressure course of a corresponding combustion process within the engine.

3. The process according to claim 1, wherein the measured variable is a light intensity of a corresponding combustion process within the engine and the stored measured variable is a stored light intensity of a corresponding combustion process within the engine.

4. The process according to claim 1, wherein the measured variable is an ionic current of a corresponding combustion process within the engine and the stored measured variable is a stored ionic current of a corresponding combustion process within the engine.

5. The process according to claim 1, wherein detected measured variables corresponding to respective work cycles are set in relation to one another by comparison.

6. The process according to claim 5, wherein the detected measured variables are set in relation by subtraction.

7. The process according to claim 5, wherein the detected measured variables are set in relation by statistical evaluation.

8. The process according to claim 1, wherein a cross-correlation function of a detected, influenceable measured variable is formed with a similar time-delayed influenceable measured variable and characteristics are derived from the cross-correlation function which are to be set in relation to one another.

9. The process according to claim 8, wherein a respective maximum of the cross-correlation function constitutes a characteristic.

10. The process according to claim 8, wherein a change in a detectable measured variable, in particular of pressure course as a function of time, is detected as an evaluation characteristic for a setting in relation.

11. The process according to claim 10, wherein a time interval within which a passage through a predetermined threshold value for the detected, influenceable measured variable, in particular of combustion chamber pressure between pressure increase and pressure decrease, occurs is detected as a comparison characteristic.

12. The process according to claim 11, wherein a pulse to no-current ratio between successive passages through the threshold value comprising a chronological succession of square-wave pulses is detected as a comparison and evaluation characteristic.

13. The process according to claim 12, wherein an evaluation is performed by forming a standard deviation via a detection of a succession of a predetermined number of work cycles, preferably 10.

14. The process according to claim 13, wherein the standard deviation is standardized by forming a mean value.

15. The process according to claim 14, wherein to form at least one of the standard deviation and the mean value, one of a constant number of work cycles and a constant duration is specified in each case.

16. The process according to claim 11, wherein upon detection of the pressure course as the influenceable measured variable, the threshold value is changed as a function of at least one of detected maximal pressure and a mean effective pressure derived from the detected maximal pressure of one of a work cycle and a succession of work cycles.

17. A device for performing the process according to claim 11, wherein the threshold value is plotted by regulation to a constant duty factor.

18. The device for performing the process according to claim 17, in a reciprocating piston internal combustion engine, in which at least one cylinder is connected to a sensor for detecting a measured variable which can be influenced by a conversion of fuel into energy as a function of time, which sensor is connected to a characteristic former for forming a characteristic signal which is derived from the influenceable measured variable, a signal output of the characteristic former being connected to an evaluation unit.

19. The device according to claim 18, wherein the characteristic former has a comparator and an integrator for mean value formation whose signal input is respectively connected to the sensor, and in which a signal output of the integrator is connected to the comparator, and wherein a characteristic signal to be supplied to the evaluation unit is present at a signal output of the comparator, preferably as a square-wave signal.

20. The device according to claim 19, wherein the signal output of the comparator is connected to an integrator and to an edge detector for producing a pulse to no-current ratio from the characteristic signal, and wherein the signal output of the integrator is connected to a sample-and-hold circuit, while a signal output of the edge detector is connected to the integrator and to the sample-and-hold circuit, a signal output of the sample-and-hold circuit being connected to a signal output.

21. The device according to claim 20, wherein the signal output of the sample-and-hold circuit has a mean value former and a subtractor which are connected to a signal output of the evaluation unit and wherein a signal output of the subtractor is connected to an absolute value former which sends an adjusting signal.

22. The device according to claim 21, wherein an integrator, preferably a transient integrator for the adjusting signal, is connected to an output side of the absolute value former.

23. The device according to claim 18, wherein a signal output of engine electronics for controlling engine operation is connected.

* * * * *